United States Patent
Bagwell et al.

(10) Patent No.: US 8,601,054 B2
(45) Date of Patent: Dec. 3, 2013

(54) PROJECT-RELATED COMMUNICATIONS

(75) Inventors: Derek P. Bagwell, Rochester, MN (US); Sivakumar Jambunathan, Round Rock, TX (US); Indran Naick, Cedar Park, TX (US); Cheranellore Vasudevan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1830 days.

(21) Appl. No.: 11/567,776

(22) Filed: Dec. 7, 2006

(65) Prior Publication Data
US 2008/0140782 A1    Jun. 12, 2008

(51) Int. Cl.
*G06F 15/16*    (2006.01)

(52) U.S. Cl.
USPC ........................................... 709/204

(58) Field of Classification Search
USPC ........................................... 709/204
See application file for complete search history.

(56) References Cited

U.S. PATENT DOCUMENTS

| | | | |
|---|---|---|---|
| 5,585,839 A * | 12/1996 | Ishida et al. | 348/14.09 |
| 5,914,747 A | 6/1999 | Hamilton | |
| 6,389,114 B1 * | 5/2002 | Dowens et al. | 379/52 |
| 6,559,863 B1 | 5/2003 | Megiddo | |
| 6,839,417 B2 | 1/2005 | Weisman et al. | |
| 6,978,245 B1 | 12/2005 | Tsuchiya et al. | |
| 7,107,312 B2 | 9/2006 | Hackbarth et al. | |
| 2001/0033298 A1 * | 10/2001 | Slotznick | 345/758 |
| 2002/0078150 A1 * | 6/2002 | Thompson et al. | 709/204 |
| 2008/0123647 A1 * | 5/2008 | Chen et al. | 370/390 |

OTHER PUBLICATIONS

"webahead Prototypes", IBM Community Tools, http://w3.webahead.ibm.com/ict/, accessed on Jun. 10, 2011, 2 pages.

* cited by examiner

*Primary Examiner* — Hussein Elchanti
*Assistant Examiner* — Maceeh Anwari
(74) *Attorney, Agent, or Firm* — Stephen J. Walder, Jr.; Mark C. Vallone (57) ABSTRACT

Systems, methods and media for processing project related communications between users of computers and to provide listening functionality for the users. In one embodiment, a system allows a third party project member to optionally listen in on an electronic conversation between two or more project members. The system further allows the third party project member to conduct a keyword search of messages relating to the project.

20 Claims, 4 Drawing Sheets

PROJECT-RELATED COMMUNICATIONS

FIELD

The present invention is in the field of communications between users of computers. More particularly, the invention relates to project related communications between project members.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Computers also facilitate communications between computer users. For example, suppose a couple of computer users working for a company are assigned to the same project and wish to communicate with one another electronically concerning the project. When a project participant wants to send a project related message to another project participant the participant opens a window at his or her computer, selects the recipient, specifies the subject, and types in the message. The participant then sends the message. A server that connects to both computers of the sender and recipient receives the message and routes the message to the designated recipient. The message appears in a window on the recipient's computer monitor video screen and the recipient then reads the message. The recipient may then respond by typing a response and sending the response to the sender. The sender receives the response and may respond to the recipient, and so forth.

There may be other project members that may be interested in the subject and text of the conversation between the first two project members. One way to inform the other project members is to broadcast the emails or instant messages exchanged between the two members to all the other members of the project. However, this is undesirable because some project members may not be interested in listening in on the conversation and the compulsory receipt of these messages clutters the project member's mailbox. Another way of informing other project members of the conversation is to explicitly copy the emails or instant messages to other project members. However, this requires explicit action on the part of the message sender and, again, may send the message to a member that does not desire to receive the communication. Another drawback is that a project member may wish to overhear a conversation between two other project members, but only if the conversations pertains to a particular subject relating to the project. Presently, systems provide no mechanism for the third party to gain knowledge of only those conversations relating to a particular subject.

Thus, there is a need for systems and method that allow selective listening in of conversations relating to a project. There is a need for a system which allows for a third party to request to listen in on an ongoing conversation or opt not to listen in on the conversation. Further, there is a need to allow a user to search for those conversations that relate to a particular subject of interest to the user, and exclude those messages that do not relate to the subject of interest.

SUMMARY

The present invention provides systems, methods and media for processing listen requests for selectively listening in on a project related electronic conversation. Thus, one embodiment is a method for selective listening of electronic communications. The method comprises receiving a message from a first member of a project to which the communication relates. The message is addressed to a second member of the project and a subject of the message signifies a new conversation between the first and second member of the project. The message is transmitted to the second member. The method involves broadcasting to other project members that the new conversation has started. A listen request may be received from a third party. In response, a copy of the message and any subsequent messages on the subject of the conversation is sent to the third party in response to the listen request.

Another embodiment is a system for selective listening of electronic communications. The system comprises a message transceiver to receive messages and transmit messages on a subject relating to a project from and to a first and second project participant, thereby enabling a conversation between them. The transceiver also transmits messages between the first and second participants to a third party in response to a listen request from the third party. The system also comprises a listen processor to broadcast to project participants when a new conversation concerning a subject is initiated by the first project participant, and to receive listen requests from the third party.

Another embodiment of the invention provides a computer program product comprising instructions effective, when executing in a data processing system, to cause the system to perform a series of operations for processing listen requests to listen to project related electronic communications. The series of operations comprise receiving a message from a first member of a project to which the communication relates, the message addressed to a second member of the project. The subject of the message signifies a new conversation between the first and second member of the project. The series of operations comprise transmitting the message to the second member and broadcasting to other project members that the new conversation has started. The series of operations further comprise receiving a listen request from a third party. In response thereto a copy of the message and any subsequent messages on the subject of the conversation are sent to the third party.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed description below is designed to render various embodiments obvious to a person of ordinary skill in the art.

Systems, methods and media for processing project related communications between users of computers and to provide listening functionality for the users. In one embodiment, a system allows a third party project member to optionally listen in on an electronic conversation between two or more project members. The system further allows the third party project member to conduct a keyword search of messages relating to the project.

Figure 1:
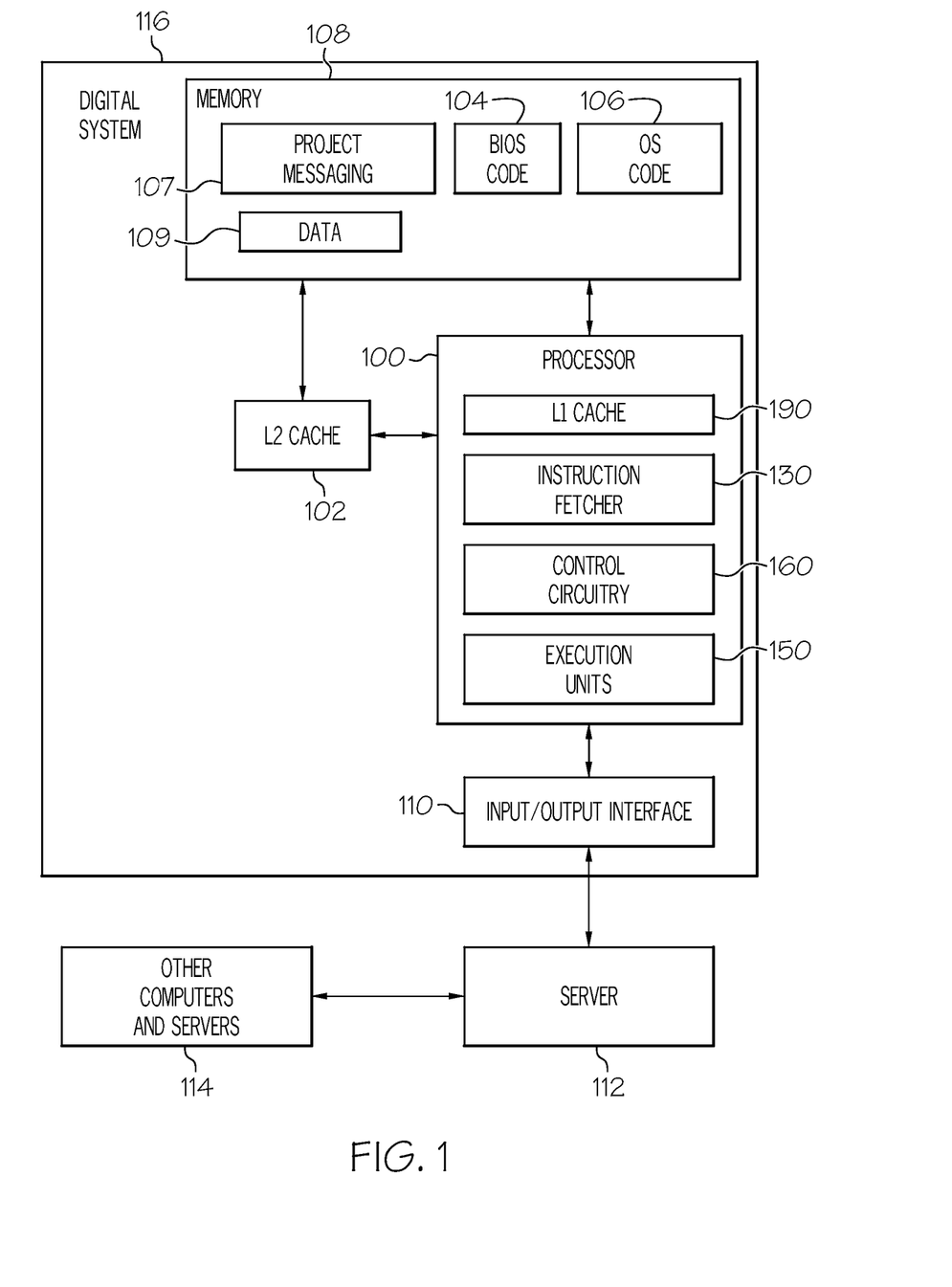
FIG. 1 depicts an embodiment of a digital system within a network; the digital system comprises a messaging processor to process listen requests.

FIG. 1 shows a digital system 116 (herein sometimes referred to as a machine) such as a computer or server implemented according to one embodiment of the present invention. Digital system 116 comprises a processor 100 that can operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of computer system 116. Digital system 116 comprises a level 2 (L2) cache 102 located physically close to processor 100. Memory 108 also stores other programs for execution by processor 100 and stores data 109.

In an embodiment, memory 108 stores project messaging computer code 107 to facilitate communications between project participants. In one embodiment, project messaging program 107 operates to receive communication requests from project participants. When a project participant wants to send a project related message to another project participant the participant opens a window at his or her computer in a project context, selects the recipient, specifies the subject, and types in the message. The participant then sends the message. A server 116 receives the message and routes the message to the designated recipient. The message appears in a window on the recipient's computer monitor video screen and the recipient then reads the message. The recipient may then respond by typing a response and sending the response to the sender. The sender receives the response and may respond to the recipient, and so forth.

When such one-to-one communication is established between two project participants, the project messaging program notifies other project participants that a project related conversation is taking place and notifies them of the subject of the conversation. This notification is broadcast to all project members that are authorized to receive project related messages. Each project member then has the option to "overhear" the conversation. That is, a third project team member may select to receive the messages between the conversation participants. Note that the messages that constitute the conversation between the original participants are not broadcast to the other project participants. Rather, each project team member can decide whether to listen in on the conversation.

In addition to listening in on the conversation, a project participant may join the conversation. Further, any project member may perform a key word search to determine if the conversation relates to a particular subject of interest to the project member. Thus, when a project team member is notified that a conversation is taking place between two or more other participants, he or she may enter keywords to be searched in the subject line or text of the messages between the conversation participants. The server 116 keeps a copy of each message sent between the conversation participants and receives the keywords to be searched. Server 116 will then search the conversation text (and subject line) of the messages to determine if the keyword appears therein. If so, the server notifies the participant that requested the key word search and sends to the participant a list of the messages in which the keyword appears, preferably in chronological order. The participant requesting the search can then select any one or more of the messages to read. The keywords will be highlighted in the message when viewed by the participant that requested the search. Thus, processor 100 of server 116 will execute project messaging software to process messages, listen requests, and search requests and enable a project member to listen in or "overhear" a conversation between two or more other project members.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. In a superscalar architecture, different execution units operate in parallel. Thus, execution units 150 comprise a set of units of different types operating in parallel to execute instructions to process requests to listen to conversations between project members and to process requests to search for keyword in the conversation messages.

Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

Digital system 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc.

Digital systems 116 may include personal computers, workstations, servers, mainframe computers, notebook or laptop computers, desktop computers, or the like. Processor 100 may also communicate with a server 112 by way of Input/Output Device 110. Server 112 connects system 116 with other computers and servers 114. Thus, digital system 116 may be in a network of computers such as the Internet and/or a LAN. Further, server 112 may control access to other memory comprising tape drive storage, hard disk arrays, RAM, ROM, etc.

Thus, in one mode of operation of digital system 116, the L2 cache receives from memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include load and store instructions, branch instructions, arithmetic logic instructions, floating point instructions, etc. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Each of the units of execution units 150 may be adapted to execute a specific set of instructions. Instructions can be submitted to different execution units for execution in parallel. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

A digital system 116 will have its own memory for storing its operating system, BIOS, and the code for executing application programs, as well as files and data. The memory of a computer comprises Read-Only-Memory (ROM), cache memory implemented in DRAM and SRAM, a hard disk drive, CD drives and DVD drives. A server also has its own memory and may control access to other memory such as tape drives and hard disk arrays. Each computer may store and execute its own application programs. Some application programs, such as databases, may reside in the server. Thus, each computer may access the same database stored in a server. In addition, each computer may access other memory by way of a server.

Figure 2:
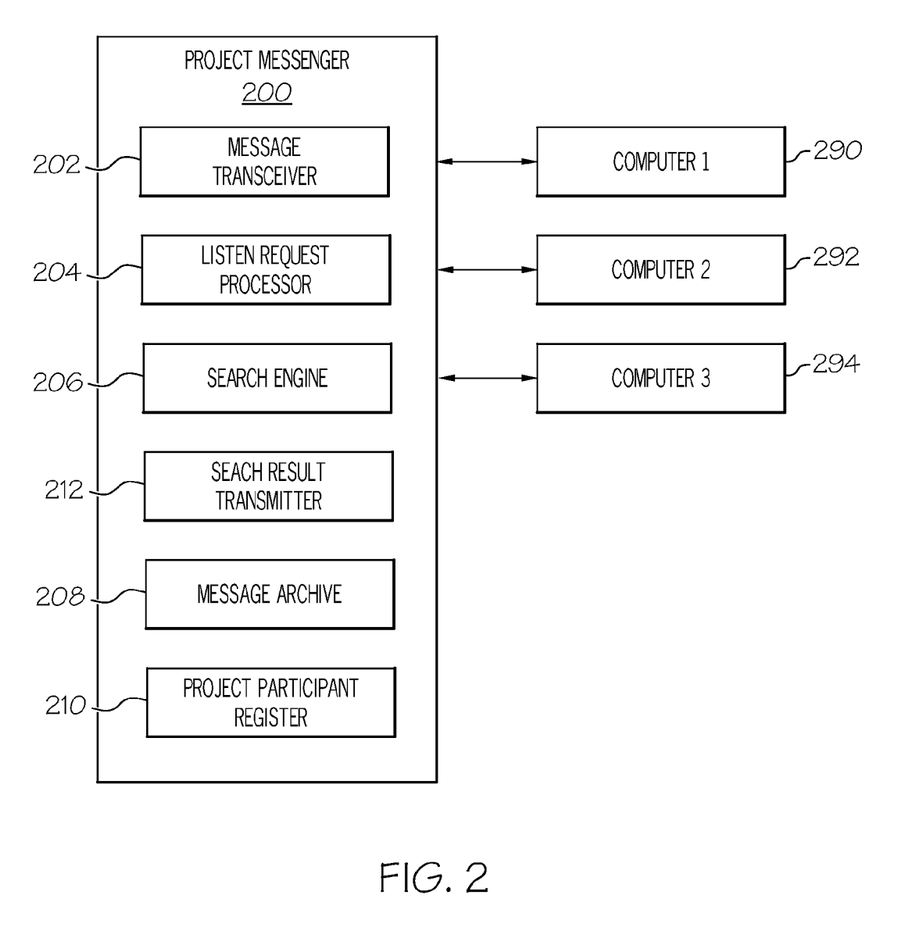
FIG. 2 depicts an embodiment of project messenger system for processing listen requests from an authorized project member.

FIG. 2 shows a block diagram of an embodiment of a project messenger system 200 for enabling listen-in and search functionality for emails and instant messages. Project messenger system 200 typically resides in a server such as server 116 and is in communication with a plurality of computers shown as computers 1, 2 and 3, (290, 292, and 294, respectively).

Project messenger 200 comprises a message transceiver 202. Message transceiver 202 receives and transmits messages between computers 290, 292, and 294. Thus, suppose that a project member using computer 1 (user 1) desires to communicate with a project member using computer 2 (user 2). User 1 initiates an email or instant message by specifying the recipient, the subject, and the text of the message and then sends the message. The sent message is received by message transceiver 202 from computer 1. Message transceiver 202 sends the message received from computer 1 to computer 2. User 2 of computer 2 receives the message, reads it and optionally responds to the message. If user 2 responds by typing a responsive message, message transceiver 202 receives the message from computer 2 and transmits it to computer 1 to be read by user 1.

Project messenger 200 comprises a message archive 208 to store messages between project members. Each message stored in message archive 208 comprises an address of the sender of the message and the address of the recipient(s) of the message. Thus, when message transceiver 202 receives a message, message transceiver 202 stores a copy of the message in message archive 208. These messages may be organized in message archive 208 in chronological order, and by project, subject, sender, and recipient. Thus, message archive 202 may be implemented as a database that may be searched by project, by time and date sent, by sender, by recipient, by subject and by content of the text of the message, etc. This enables a third party project member to search the database using keywords to obtain only those messages that pertain to a particular topic.

Accordingly, project messenger 200 comprises a search engine 206 which provides an interface for entering search queries to search message archive 208. Thus, search engine 206 may receive from user 3 of computer 3, for example, a search request for all emails sent by user 1 of computer 1 and user 2 of computer 2 that are related to the project to which the user of computer 3 is a registered participant. Search engine 206 would then search message archive 208 for the requested messages. The results of the search would then be transmitted to the search requester's computer by a search result transmitter 212. Search result transmitter 212 formats and organizes the results of the search prior to transmission to the requesting computer. Thus, a third party project member may conduct a search of only those messages of a conversation that relate to a particular topic.

As another example, user 3 of computer 3 may request a keyword search of project related messages between user 1 and user 2. Search engine 206 receives the keywords and performs a search of the subjects and text of the messages between user 1 and user 2 that are stored in message archive 208. The search may result in one or more messages that contain the keyword(s) that were searched. The messages that have the keywords may be organized in chronological order and transmitted to computer 3 by search result transmitter 214. User 3 of computer 3 may then select which of the related messages he or she wants to read.

Project messenger system 200 also comprises a listen processor 204. Listen processor 204 receives request from a project registrant to listen in on a conversation between two or more other project registrants. To this end, and to guard against eavesdropping by someone who is not a member of the project team, project participant register 210 comprises a list of those that are registered as project members. Thus, when a listen request is received from a user, the listen processor 204 queries the project participant register 210 to determine if the listen requester is a registered participant of the project. If not, a message is sent to the requestor informing him or her that he or she is not authorized to listen in on the conversation. If the requester is a project participant, as determined from the project participant register, then listen processor 204 provides to the listen requester a copy of the messages between the users whose conversation the requester wants to overhear.

Thus, listen processor 204 notifies all project participants when a new conversation is taking place between two or more project members. Listen processor 204 may then receive a request to listen from a user who is a project team member.

Listen processor 204 may then retrieve the archived messages between the participants from message archive 208, and also forward a copy of any subsequent messages between the participants to the user who requested to listen in on the conversation. Further, an authorized project participant may conduct a keyword search of messages of the conversation.

Thus, some embodiments comprise a system for selective listening of electronic communications. The system comprises a message transceiver to receive messages and transmit messages on a subject relating to a project from and to a first and second project participant, thereby enabling a conversation between them. The transceiver also transmits messages between the first and second participants to a third party in response to a listen request from the third party. The system also comprises a listen processor to broadcast to project participants when a new conversation concerning a subject is initiated by the first project participant, and to receive listen requests from the third party.

The system may further comprise a search engine to process keyword search requests from the third party to return messages to the third party that contain the keywords specified by the third party. The messages may be stored in a message archive to retrievably store the messages between the first and second project participants. The message archive may be a searchable database, which may be organized by project and message subject. The system may further comprise a list of project participants, in order to exclude listen requests and search requests from non-project-participants. The system also receives and authorizes an option by the third party to join the conversation.

Figure 3:
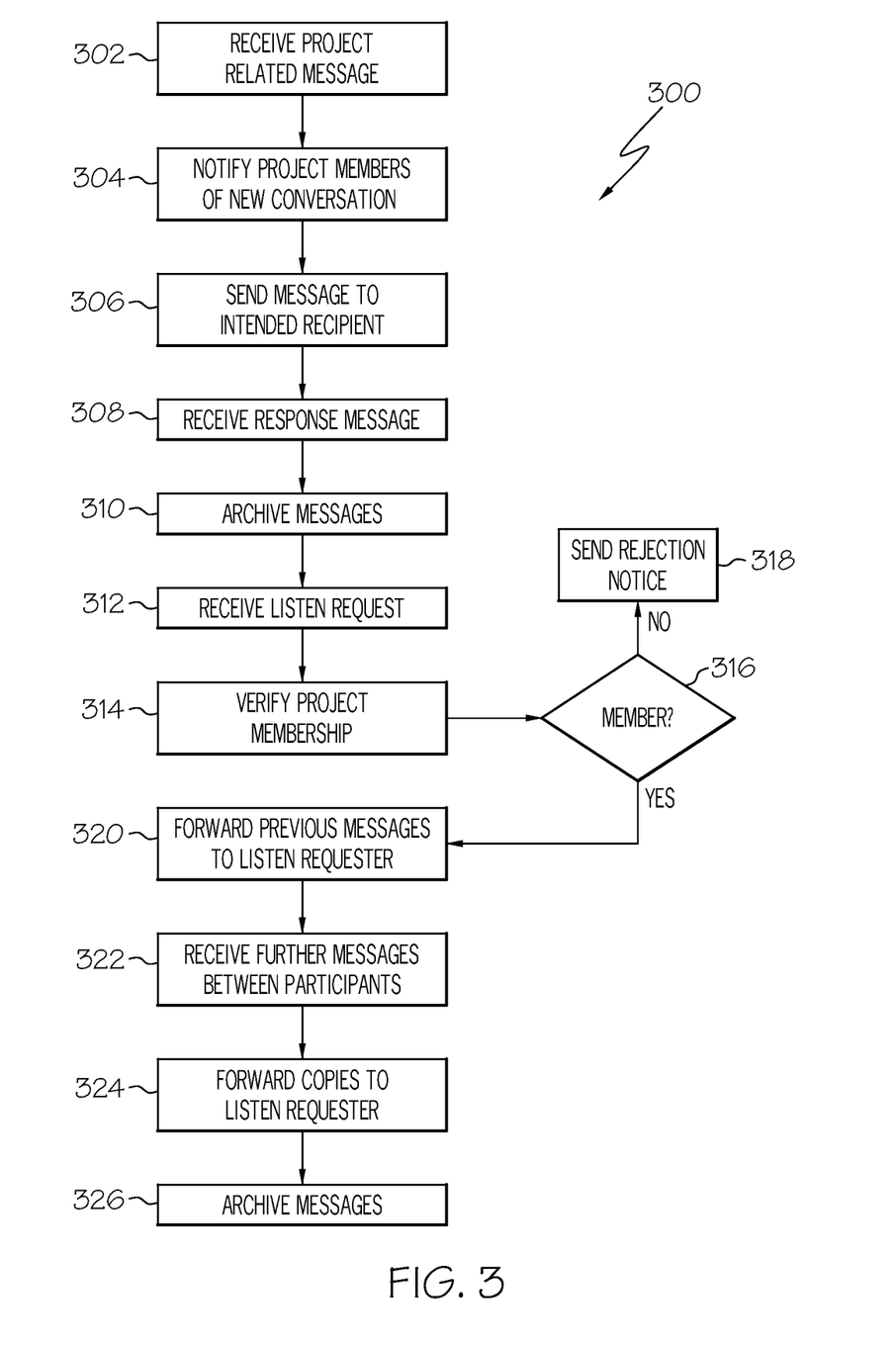
FIG. 3 depicts a flow chart of an embodiment for processing listen requests.

FIG. 3 shows a flow chart 300 of an embodiment for processing project related messages and listen requests. First, project messenger system 200, which may reside on a server connected to a plurality of computers, receives a project related message from one computer intended to be received by the user of another computer (element 302). System 200 then broadcasts to all project members listed in project member register 210 that a new message has been sent (element 304). This alerts each member that they have the option to listen in or ignore the ensuing conversation. System 200 also sends the new message to the intended recipient as specified by the sender of the message (element 306). The recipient may then send a response message (element 308). This response message, along with the original message is archived (element 310).

In the course of operation, system 200 may receive from a third person a listen request which is a request to listen in on the project related conversation established between the sender of the original message and the sender of the response message (element 312). System 200 will then verify if the third party is a registered member of the project to which the conversation relates (element 312). If the third party is not a member (element 316), then a rejection message is sent (element 318) that notifies the third party he is not member of the project and is, consequently, not authorized to listen in to the project related conversation. If the third party is a member of the project (element 316), then system 200 forwards the previous messages between the conversation participants to the third party project member (element 320).

Meanwhile, system 200 may receive additional messages from the original participants in the conversation (element 322). Once listening privileges are established for the third party, subsequent messages of the conversing parties are forwarded to the third party listen requester (element 324). Also, the subsequent messages are also archived, preferably in a searchable database (element 326). This database may be therefore searched by project, by subject and/or by keywords.

Figure 4:
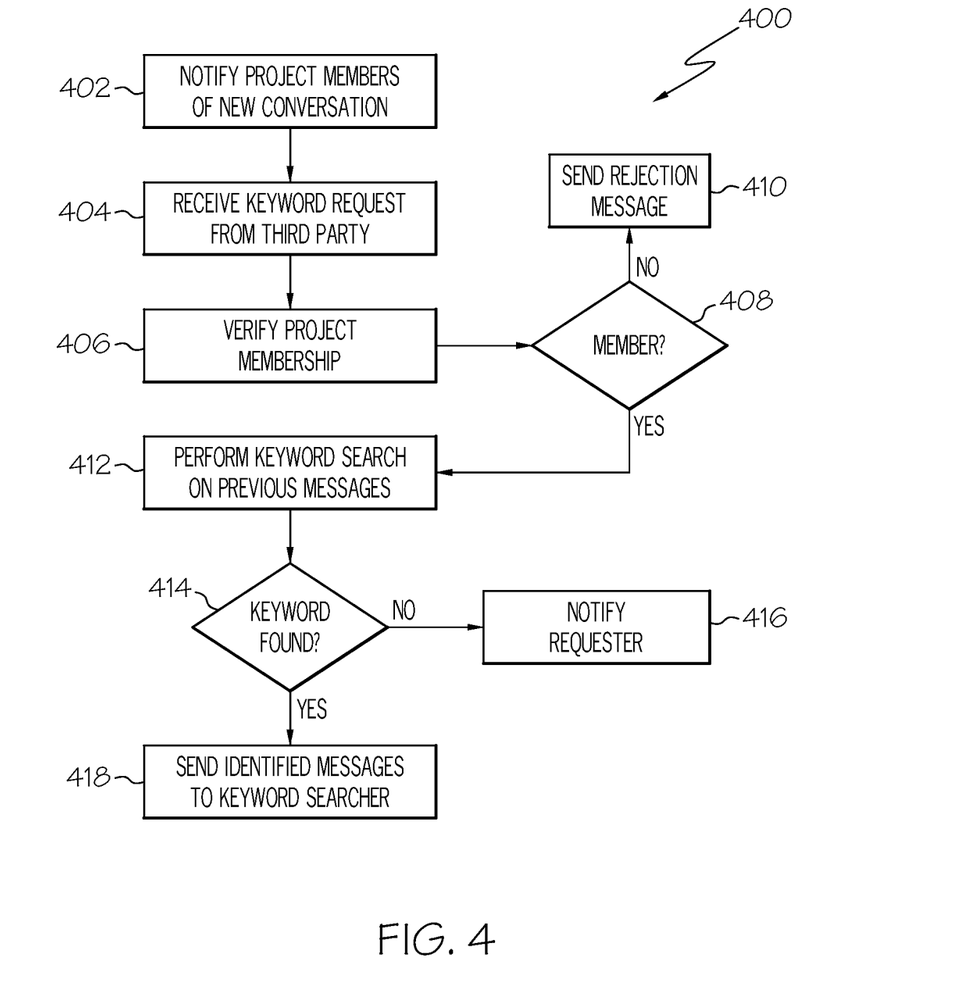
FIG. 4 depicts a flow chart of an embodiment for processing message search requests.

FIG. 4 shows a flow chart 400 of an embodiment of a process for enabling a keyword search of messages of a conversation between project members. When a new conversation between members is started, system 200 notifies all members of the start of the new conversation (element 402). During the conversation (or after the conversation is over), system 200 may receive a key word search from a third party (element 404). System 200 receives the keyword search request and first verifies whether the third party is a member of the project (element 406). If not, (element 406), then system 200 sends a rejection notice to the third party telling the third party he or she is not a member of the project (element 410). Thus, the system has the ability to discriminate against unauthorized users.

If the third party is a project member, then system 200 proceeds to perform a key word search of messages between the original conversation participants (element 412). If the third party specified key word(s) are not found (element 414), then the third party project member is notified that the keyword(s) are not found (element 416). If the keyword(s) are found (element 414), then the identified messages which contain the keyword(s) are sent to the third party member that requested the search (element 418). The authorized party may then select which messages he or she wants to read.

Thus, some embodiments comprise a method for selective listening of electronic communications. The method comprises receiving a message from a first member of a project to which the communication relates. The message is addressed to a second member of the project and a subject of the message signifies a new conversation between the first and second member of the project. The message is transmitted to the second member. The method involves broadcasting to other project members that the new conversation has started. A listen request may be received from a third party. In response, a copy of the message and any subsequent messages on the subject of the conversation is sent to the third party in response to the listen request.

The method may further comprise receiving a keyword search request from the third party and conducting a keyword search of the subject and text of messages on the subject of the conversation. The method may further comprise storing messages on the subject of the conversation in a searchable database and searching the database in response to a keyword search request from a project member. The method may further comprise providing a project member register comprising a list of project members to exclude listen requests from non-project-members. The third party may also choose an option to join the conversation. This option may be denied to a non-project-member.

The invention can take the form of an entirely hardware embodiment, an entirely software embodiment or an embodiment containing both hardware and software elements. In one embodiment, the invention is implemented in software, which includes but is not limited to firmware, resident software, microcode, etc. Furthermore, embodiments can take the form of a computer program product accessible from a machine accessible readable medium providing program code for use by or in connection with a computer such as shown in FIG. 1, or any instruction execution system.

For the purposes of this description, a machine accessible or computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment of the invention provides a computer program product containing instructions effective, when executing in a data processing system, to cause the system to perform a series of operations for processing listen requests to listen to project related electronic communications. The series of operations comprise receiving a message from a first member of a project to which the communication relates, the message addressed to a second member of the project. The subject of the message signifies a new conversation between the first and second member of the project. The series of operations comprise transmitting the message to the second member and broadcasting to other project members that the new conversation has started. The series of operations further comprise receiving a listen request from a third party. In response thereto a copy of the message and any subsequent messages on the subject of the conversation are sent to the third party.

The series of operations may further comprise receiving a keyword search request from the third party and conducting a keyword search of the subject and text of messages on the subject of the conversation. Messages on the subject of the conversation may be stored in a searchable databases and the database may be searched in response to a search request by the third party. The series of operations may further comprise providing a project member register comprising a list of project members to exclude listen requests from non-project-members. The operations may further comprise receiving and authorizing a request by the third party to join the conversation.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for selectively sending electronic communications, the method comprising:

receiving, by at least one computer system having at least one processor coupled to memory, a first message at a beginning of an electronic messaging conversation between first and second members of a project, the first message comprising a subject, text, and being from the first member of the project and addressed to the second member of the project;

transmitting, by the at least one computer system, the first message to the second member;

broadcasting, by the at least one computer system, a notification to other project members of the beginning of the electronic messaging conversation;

receiving, by the at least one computer system and subsequent to the broadcasting, a listen request from a third party member of the project that is not already part of the electronic messaging conversation, the listen request being a request to listen in on the electronic messaging conversation;

sending, by the at least one computer system in response to the receiving of the listen request, to the third party member of the project an archived copy of the first message; and sending, by the at least one computer system, to the third party member of the project, an archived copy of a second message of the electronic messaging conversation, wherein the second message is subsequent to the first message in the electronic messaging conversation.

2. The method of claim 1, further comprising receiving a keyword search request from the third party member of the project and conducting a keyword search on one or more messages of the electronic messaging conversation, wherein the listen request is received from the third party in response to the keyword search returning search results indicative of a subject of interest to the third party.

3. The method of claim 1, further comprising storing the first message and the second message in a searchable database.

4. The method of claim 3, further comprising searching the searchable database in response to a keyword search request from the third party member of the project, wherein the keyword search request comprises one or more of project name, project type, time, date, sender, recipient, subject, or content of the text.

5. The method of claim 1, further comprising rejecting a second listen request from a non-member of the project in response to determining that the non-member of the project is not listed in a project member register.

6. The method of claim 1, further comprising receiving, from the third party member of the project, an acceptance of an option to join the electronic messaging conversation.

7. The method of claim 1, further comprising receiving, from a non-member of the project, a denial of an option to join the electronic messaging conversation.

8. A computer program product for selectively sending electronic communications, the computer program product comprising:

one or more computer-readable tangible storage devices;

program instructions, stored on at least one of the one or more storage devices, to receive a first message at a beginning of a electronic messaging conversation between first and second members of a project, the first message comprising a subject, text, and being from the first member of the project and addressed to the second member of the project;

program instructions, stored on at least one of the one or more storage devices, to transmit the first message to the second member;

program instructions, stored on at least one of the one or more storage devices, to broadcast a notification to other project members of the beginning of the electronic messaging conversation;

program instructions, stored on at least one of the one or more storage devices to receive, subsequent to broadcasting the notification, a listen request from a third party member of the project that is not already part of the electronic messaging conversation, the listen request being a request to listen in on the electronic messaging conversation;

program instructions, stored on at least one of the one or more storage devices, to, in response to receiving the listen request, send to the third party member of the project an archived copy of the first message; and program instructions, stored on at least one of the one or more storage devices, to, send to the third party member of the project an archived copy of a second message of the electronic messaging conversation, wherein the second message is subsequent to the first message in the electronic messaging conversation.

9. The computer program product of claim 8, further comprising:

program instructions, stored on at least one of the one or more storage devices, to receive a keyword search request from the third party member of the project; and program instructions, stored on at least one of the one or more storage devices, to conduct a keyword search on one or more messages of the electronic messaging conversation, wherein the listen request is received from the third party in response to the keyword search returning search results indicative of a subject of interest to the third party.

10. The computer program product of claim 8, further comprising program instructions, stored on at least one of the one or more storage devices, to store the first message and the second message in a searchable database.

11. The computer program product of claim 10, further comprising program instructions, stored on at least one of the one or more storage devices, to search the searchable database in response to a keyword search request from the third party member of the project, wherein the keyword search request comprises one or more of project name, project type, time, date, sender, recipient, subject, or content of the text.

12. The computer program product of claim 8, further comprising program instructions, stored on at least one of the one or more storage devices, to reject a second listen request from a non-member of the project in response to determining that the non-member of the project is not listed in a project member register.

13. The computer program product of claim 8, further comprising program instructions, stored on at least one of the one or more storage devices, to receive, from the third party member of the project, an acceptance of an option to join the electronic messaging conversation.

14. A computer system for selectively sending electronic communications, the computer system comprising:

one or more processors, one or more computer-readable memories and one or more computer-readable, tangible storage devices;

program instructions, stored on at least one of the one or more storage devices for execution by at least one of the one or more processors via at least one of the one or more memories, to receive a first message at a beginning of an electronic messaging conversation between first and second members of a project, the first message comprising a subject, text, and being from the first member of the project and addressed to the second member of the project;

program instructions, stored on at least one of the one or more storage devices for execution by at least one of the one or more processors via at least one of the one or more memories, to transmit the first message to the second member;

program instructions, stored on at least one of the one or more storage devices for execution by at least one of the one or more processors via at least one of the one or more memories, to broadcast a notification to other project members of the beginning of the electronic messaging conversation;

program instructions, stored on at least one of the one or more storage devices for execution by at least one of the one or more processors via at least one of the one or more memories, to, subsequent to broadcasting the notification, receive a listen request from a third party member of the project that is not already part of the electronic messaging conversation, the listen request being a request to listen in on the electronic messaging conversation;

program instructions, stored on at least one of the one or more storage devices for execution by at least one of the one or more processors via at least one of the one or more memories, to, in response to receiving the listen request, send the third party member of the project an archived copy of the first message; and program instructions, stored on at least one of the one or more storage devices for execution by at least one of the one or more processors via at least one of the one or more memories, to, send to the third party member of the project an archived copy of a second message of the electronic messaging conversation, wherein the second message is subsequent to the first message in the electronic messaging conversation.

15. The computer system of claim 14, further comprising program instructions, stored on at least one of the one or more storage devices for execution by at least one of the one or more processors via at least one of the one or more memories, to receive a keyword search request from the third party member of the project and conducting a keyword search on one or more messages of the electronic messaging conversation, wherein the listen request is received from the third party in response to the keyword search returning search results indicative of a subject of interest to the third party.

16. The computer system of claim 14, further comprising program instructions, stored on at least one of the one or more storage devices for execution by at least one of the one or more processors via at least one of the one or more memories, to store the first message and the second message in a searchable database.

17. The computer system of claim 16, further comprising program instructions, stored on at least one of the one or more storage devices for execution by at least one of the one or more processors via at least one of the one or more memories, to search the searchable database in response to a keyword search request from the third party member of the project, wherein the keyword search request comprises one or more of project name, project type, time, date, sender, recipient, subject, or content of the text.

18. The computer system of claim 14, further comprising program instructions, stored on at least one of the one or more storage devices for execution by at least one of the one or more processors via at least one of the one or more memories, to reject a second listen request from a non-member of the project in response to determining that the non-member of the project is not listed in a project member register.

19. The computer system of claim 14, further comprising program instructions, stored on at least one of the one or more storage devices for execution by at least one of the one or more processors via at least one of the one or more memories, to receive, from the third party member of the project, an acceptance of an option to join the electronic messaging conversation.

20. The computer system of claim 14, further comprising program instructions, stored on at least one of the one or more storage devices for execution by at least one of the one or more processors via at least one of the one or more memories, to receive, from a non-member of the project, a denial of an option to join the electronic messaging conversation.

* * * * *